(12) United States Patent
Nakamura et al.

(10) Patent No.: US 12,003,180 B2
(45) Date of Patent: Jun. 4, 2024

(54) POWER SUPPLY FOR DRIVING SYNCHRONOUS RECTIFICATION ELEMENTS OF SEPIC CONVERTER

(71) Applicant: SANKEN ELECTRIC CO., LTD., Niiza (JP)

(72) Inventors: Masaru Nakamura, Niiza (JP); Shinji Aso, Niiza (JP); Jianao Yao, Niiza (JP)

(73) Assignee: SANKEN ELECTRIC CO., LTD., Niiza (JP)

( * ) Notice: Subject to any disclaimer, the term of this patent is extended or adjusted under 35 U.S.C. 154(b) by 388 days.

(21) Appl. No.: 17/486,974

(22) Filed: Sep. 28, 2021

(65) Prior Publication Data

US 2022/0200458 A1 Jun. 23, 2022

Related U.S. Application Data

(63) Continuation of application No. PCT/JP2020/047724, filed on Dec. 21, 2020.

(51) Int. Cl.
*H02M 3/158* (2006.01)
*H02M 3/155* (2006.01)

(52) U.S. Cl.
CPC ....... *H02M 3/1588* (2013.01); *H02M 3/1557* (2021.05)

(58) Field of Classification Search
CPC ............. H02M 3/1588; H02M 3/1586; H02M 3/1584; H02M 3/158; H02M 3/1566; H02M 3/156; H02M 3/1557; H02M 3/1555
See application file for complete search history.

(56) References Cited

U.S. PATENT DOCUMENTS

| 7,352,158 B2 | 4/2008 | Remson | |
|---|---|---|---|
| 2021/0075214 A1* | 3/2021 | Schaevitz | ............. H02M 3/156 |

FOREIGN PATENT DOCUMENTS

| JP | 5937442 B2 | 6/2016 |
| JP | 2017-69180 A | 4/2017 |
| JP | 2019-58016 A | 4/2019 |

* cited by examiner

*Primary Examiner* — Nguyen Tran
(74) *Attorney, Agent, or Firm* — METROLEX IP LAW GROUP, PLLC

(57) ABSTRACT

A DC-DC converter according to one or more embodiments is disclosed that may include: a drive voltage switching circuit of a drive circuit that drives a synchronous rectification MOS transistor. The drive voltage switching circuit may switch a connection so that the drive circuit supplies power from the output voltage to the drive circuit in response to the drive voltage for supplying power to the drive circuit being set to be lower than the output voltage. The drive voltage switching circuit may switch a connection so that the drive circuit supplies power from the drive voltage in response to the drive voltage for supplying power to the drive circuit being set to be higher than the output voltage.

7 Claims, 11 Drawing Sheets

WHEN OUTPUT VOLTAGE Vo IS
LOWER THAN DRIVE VOLTAGE Vdrv: Vo < Vdrv

WHEN OUTPUT VOLTAGE Vo IS
HIGHER THAN DRIVE VOLTAGE Vdrv: Vo > Vdrv

OPERATING WAVEFORMS OF EACH PART WHEN
OUTPUT VOLTAGE Vo IS HIGHER THAN DRIVE VOLTAGE Vdrv WHEN OUTPUT VOLTAGE Vo IS
LOWER THAN DRIVE VOLTAGE Vdrv: Vo < Vdrv WHEN OUTPUT VOLTAGE Vo IS
HIGHER THAN DRIVE VOLTAGE Vdrv: Vo > Vdrv

POWER SUPPLY FOR DRIVING SYNCHRONOUS RECTIFICATION ELEMENTS OF SEPIC CONVERTER

CROSS REFERENCE TO RELATED APPLICATIONS

This application is a continuation application of International Application No. PCT/JP2020/047724, filed on Dec. 21, 2020, the entire contents of which are incorporated herein by reference.

BACKGROUND

This disclosure relates to a DC/DC converter, and in particular to a DC/DC converter including a SEPIC (Single Ended Primary Inductor Converter) circuit.

A step-up/step-down converter is used for the purpose of generating a stable output voltage from an unstable input power source such as an automobile battery. High efficiency of a power supply circuit is necessary to reduce unnecessary drain of a battery. FIG. 10 illustrates a DC-DC converter configured with a synchronous rectification SEPIC circuit that achieves loss reduction by using a P-channel MOSFET in a rectification circuit. DC-DC converters related to the above-mentioned technologies are disclosed in JP5937442 (Patent Document 1) and U.S. Pat. No. 7,352,158 (Patent Document 2).

In Patent Document 1, to supply power-supply voltage of a P-channel MOSFET drive circuit from a drive voltage Vdrv, when an output voltage Vo is lower than the drive voltage Vdrv, the P-channel MOSFET for synchronous rectification can be driven on/off, as illustrated in FIG. 11A. However, as illustrated in FIG. 11B, when the output voltage Vo is higher than the drive voltage Vdrv, a first drive signal switches from Low to High at the timing of T2*b* and exceeds a threshold Vth_Nch of a N-channel MOSFET 3, so the N-channel MOSFET 3 switches from Off to On. On the other hand, a second drive signal switches from Low to High but cannot exceed a threshold Vth_Pch of a P-channel MOSFET 6 (GND reference), so the P-channel MOSFET 6 does not switch from On to Off. For this reason, the current flows back from the output voltage Vo terminal to GND through the P-channel MOSFET 6 and a second inductor 5, and the output voltage Vo cannot rise above the drive voltage Vdrv. Therefore, there is a problem that the setting of the output voltage Vo must be limited to lower than the drive voltage Vdrv.

Patent Document 2 discloses a configuration in which a drive voltage of a P-channel MOSFET for synchronous rectification is supplied from between an output voltage and GND. This configuration simplifies a drive circuit of the P-channel MOSFET for synchronous rectification and can generate the output voltage Vo higher than the drive voltage of the drive circuit. However, the off-drive side of an output stage circuit for driving the P-channel MOSFET for synchronous rectification has a resistor. As a result, it is difficult to discharge a gate-to-source capacitance Cgs of the P-channel MOSFET for synchronous rectification at high speed. Therefore, there is a problem that responding to a high-speed switching operation required in automotive applications, such as at 2 MHz or higher, is difficult. In addition, the lower the on-resistance of the P-channel MOSFET, the larger the gate-to-source capacitance Cgs tends to be. Therefore, when a large output current is supplied, the gate-source capacitance Cgs becomes large and the switching loss increases. Even if the gate resistance is made small to speed up the switching operation, the loss of the gate resistance becomes excessive, and a high-speed switching operation becomes difficult.

Even if a general driver IC (a push-pull configuration in which an output stage is configured with a combination of a P-channel MOSFET and an N-channel MOSFET) is used for driving, sufficient drive voltage cannot be supplied under a condition in which an output voltage setting value exceeds a power supply voltage value of the driver IC, resulting in a problem that the P-channel MOSFET cannot be driven Off.

SUMMARY

A DC-DC converter according to one or more embodiments is disclosed that may include: a drive voltage switching circuit of a drive circuit that drives a synchronous rectification MOS transistor. The drive voltage switching circuit may switch a connection so that the drive circuit supplies power from the output voltage to the drive circuit in response to the drive voltage for supplying power to the drive circuit being set to be lower than the output voltage. The drive voltage switching circuit may switch a connection so that the drive circuit supplies power from the drive voltage in response to the drive voltage for supplying power to the drive circuit being set to be higher than the output voltage.

DETAILED DESCRIPTION

Embodiment 1

Figure 1:
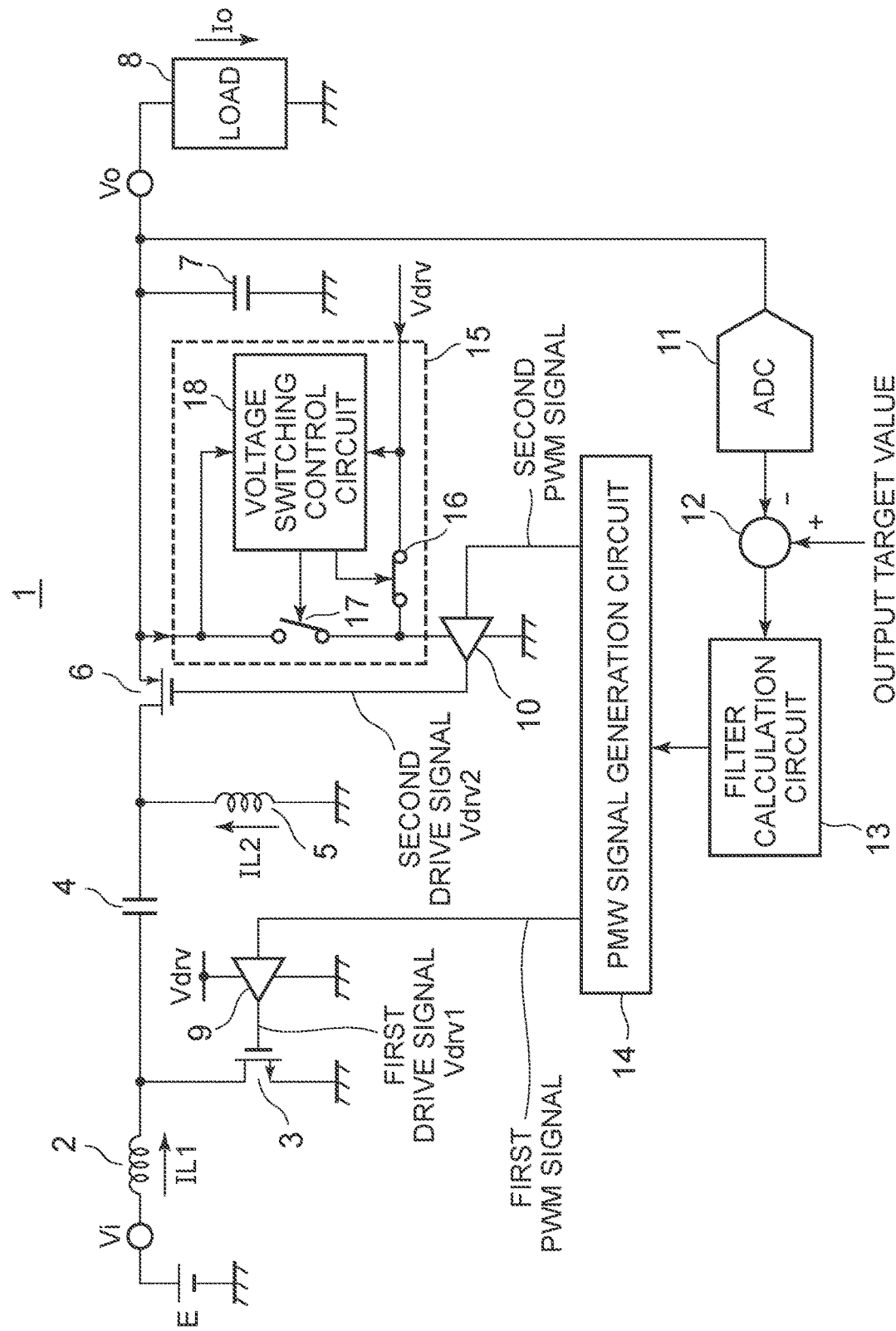
FIG. 1 is a diagram illustrating a DC/DC converter comprising a SEPIC circuit according to one or more embodiments.

FIG. 1 is a diagram illustrating a SEPIC converter according to Embodiment 1. This SEPIC converter includes a first inductor 2, an N-channel MOSFET 3, a capacitor 4, a second inductor 5, a P-channel MOSFET 6, an output capacitor 7, an output load 8, a first drive circuit 9, a second drive circuit 10, an AD converter 11, a subtractor 12, a filter calculation circuit 13, a PWM signal generation circuit 14, and a drive voltage switching circuit 15. The capacitor 4 may include a coupling capacitor. The drive voltage switching circuit 15 includes a switch 16, a switch 17, and a voltage switching control circuit 18. The voltage switching control circuit 18 compares an output voltage Vo with a drive voltage Vdrv. When the output voltage Vo is lower than the drive voltage Vdrv, the voltage switching control circuit 18 turns on the switch 16 and turns off the switch 17. Thus, the second drive circuit 10 drives the P-channel MOSFET 6 with the drive voltage Vdrv. When the output voltage Vo is higher than the drive voltage Vdrv, the voltage switching control circuit 18 turns off the switch 16 and turns on the switch 17. Thus, the second drive circuit 10 drives the P-channel MOSFET 6 with the output voltage Vo. The drive voltage Vdrv is supplied to a power supply terminal of the first drive circuit 9, and the first drive circuit 9 drives the N-channel MOSFET 3 based on a first PWM signal output from the PWM signal generation circuit 14. Since the source of the N-channel MOSFET 3 is connected to the GND side, a gate threshold voltage Vth_Nch is not affected by the output voltage Vo. The drive voltage Vdrv or the output voltage Vo is supplied to the power supply terminal of the second drive circuit 10 via the drive voltage switching circuit 15, and the second drive circuit 10 drives the P-channel MOSFET 6 based on a second PWM signal. The first inductor 2 and the second inductor 5 are excited during the period when the N-channel MOSFET 3 is on and the P-channel MOSFET 6 is off. The excited energy is supplied to the output capacitor 7 and the output load 8 to generate the output voltage Vo during the period when the N-channel MOSFET 3 is off and the P-channel MOSFET 6 is on. The AD converter 11 detects the output voltage Vo, converts the output voltage Vo into a digital value of the predetermined bit number, and outputs the digital conversion value to the subtractor 12. The subtractor 12 generates a difference value between the output target value and the digital conversion value and outputs the difference value to the filter calculation circuit 13. The filter calculation circuit 13 performs PI and PID operations based on the difference value and outputs the operation value to the PWM signal generation circuit 14. The PWM signal generation circuit 14 generates the first PWM signal and the second PWM signal having duties corresponding to the operation value.

Figure 2A:
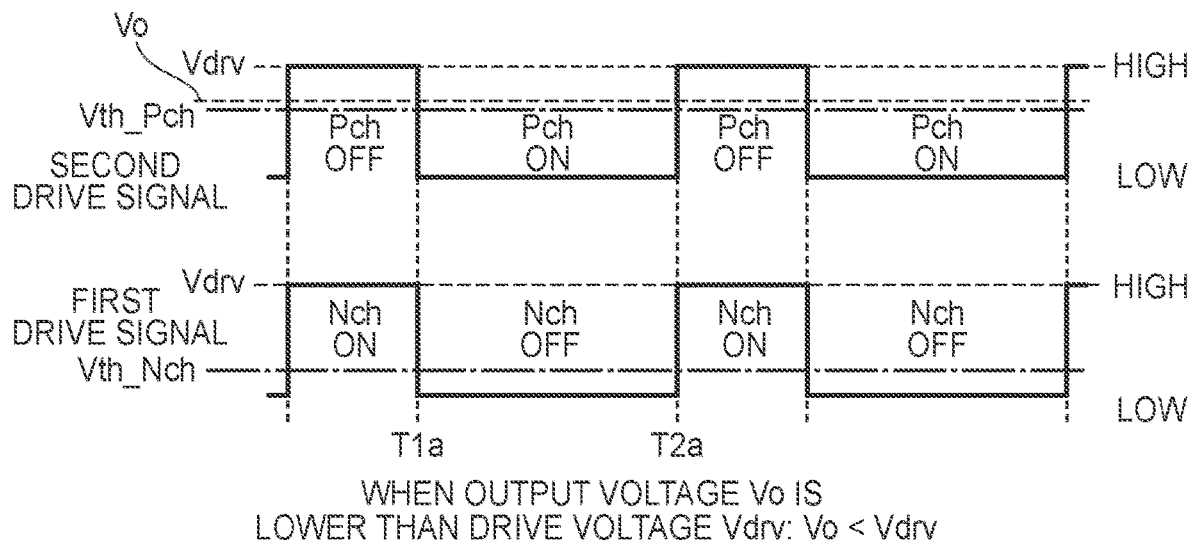
FIGS. 2A and 2B are diagrams illustrating a first drive signal and a second drive signal according to the voltage magnitude relationship between a drive voltage and an output voltage in one or more embodiments, such as illustrated in FIG. 1.
Figure 2B:
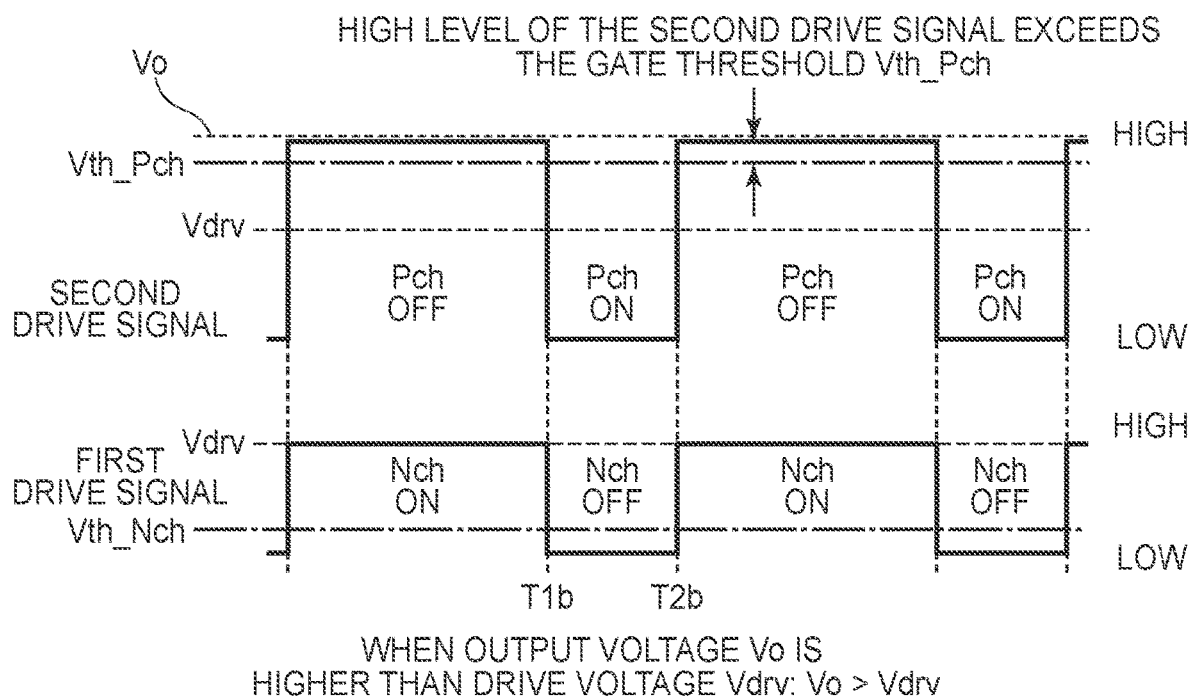

The detailed overall operation is described with reference to FIGS. 2A and 2B, which are timing charts illustrating the first drive signal and the second drive signal based on the voltage magnitude relationship between the drive voltage and the output voltage. It is assumed that approximately equal inductor values are selected for the first inductor 2 and the second inductor 5. When the output voltage Vo setting is lower than the drive voltage Vdrv setting, the drive voltage Vdrv is supplied to the power supply voltage of the first drive circuit 9, and the drive voltage Vdrv is supplied to the power supply voltage of the second drive circuit 10 through the switch 16 of the drive voltage switching circuit 15. At the timing of T1a, the first drive signal changes from High to Low and falls below the threshold value Vth_Nch of the N-channel MOSFET 2, so that the N-channel MOSFET 2 changes from On to Off. Also, the second signal changes from High to Low and falls below the threshold value Vth_Pch of the P-channel MOSFET 6 (GND reference), so that the P-channel MOSFET 6 changes from Off to On. At the timing of T2a, the first drive signal changes from Low to High and exceeds the threshold Vth_Nch of the N-channel MOSFET 3, so that the N-channel MOSFET 3 changes from Off to On. Also, the second drive signal changes from Low to High and exceeds the threshold Vth_Pch (GND reference) of the P-channel MOSFET 6, so that the P-channel MOSFET 6 changes from On to Off. On the other hand, when the output voltage Vo setting is higher than the drive voltage Vdrv setting, the drive voltage Vdrv is supplied to the power supply voltage of the first drive circuit 9, and the output voltage Vo is supplied to the power supply voltage of the second drive circuit 10 through the switch 17 of the drive voltage switching circuit 15. At the timing of T1b, the first drive signal changes from High to Low and falls below the threshold value Vth_Nch of the N-channel MOSFET 3, so that the N-channel MOSFET 3 changes from On to Off. Also, the second drive signal changes from High to Low and falls below the threshold Vth_Pch of the P-channel MOSFET 6 (GND reference), so that the P-channel MOSFET 6 changes from Off to On. At the timing of T2b, the first drive signal changes from Low to High and exceeds the threshold Vth_Nch of the N-channel MOSFET 3, so that the N-channel MOSFET 3 changes from Off to On. Also, the second drive signal changes from Low to High and exceeds the threshold Vth_Pch of the P-channel MOSFET 6 (GND reference), so that the P-channel MOSFET 6 changes from On to Off. Thus, as compared with Patent Document 1, Embodiment 1 may supply the optimal power supply voltage to the second drive circuit regardless of the output voltage value and may comprise a highly efficient power supply circuit in a wide output voltage range. As compared with Patent Document 2, Embodiment 1 may use a general driver IC with a push-pull output, in which an output stage circuit is configured with a combination of the P-channel MOSFET and the N-channel MOSFET, for the second driver circuit, so that the driver IC may support a high-speed operation and a switching operation of 2 MHz or more, which is required for automotive applications. In addition, Embodiment 1 may achieve cost reduction by integrating the second driver circuit 10 and the drive voltage switching circuit 15 on the same semiconductor substrate. The effects of implementation integration and cost reduction may be further achieved if the first inductor 2 and the second inductor 5 include elements made of a single core material.

Embodiment 2

Figure 3:
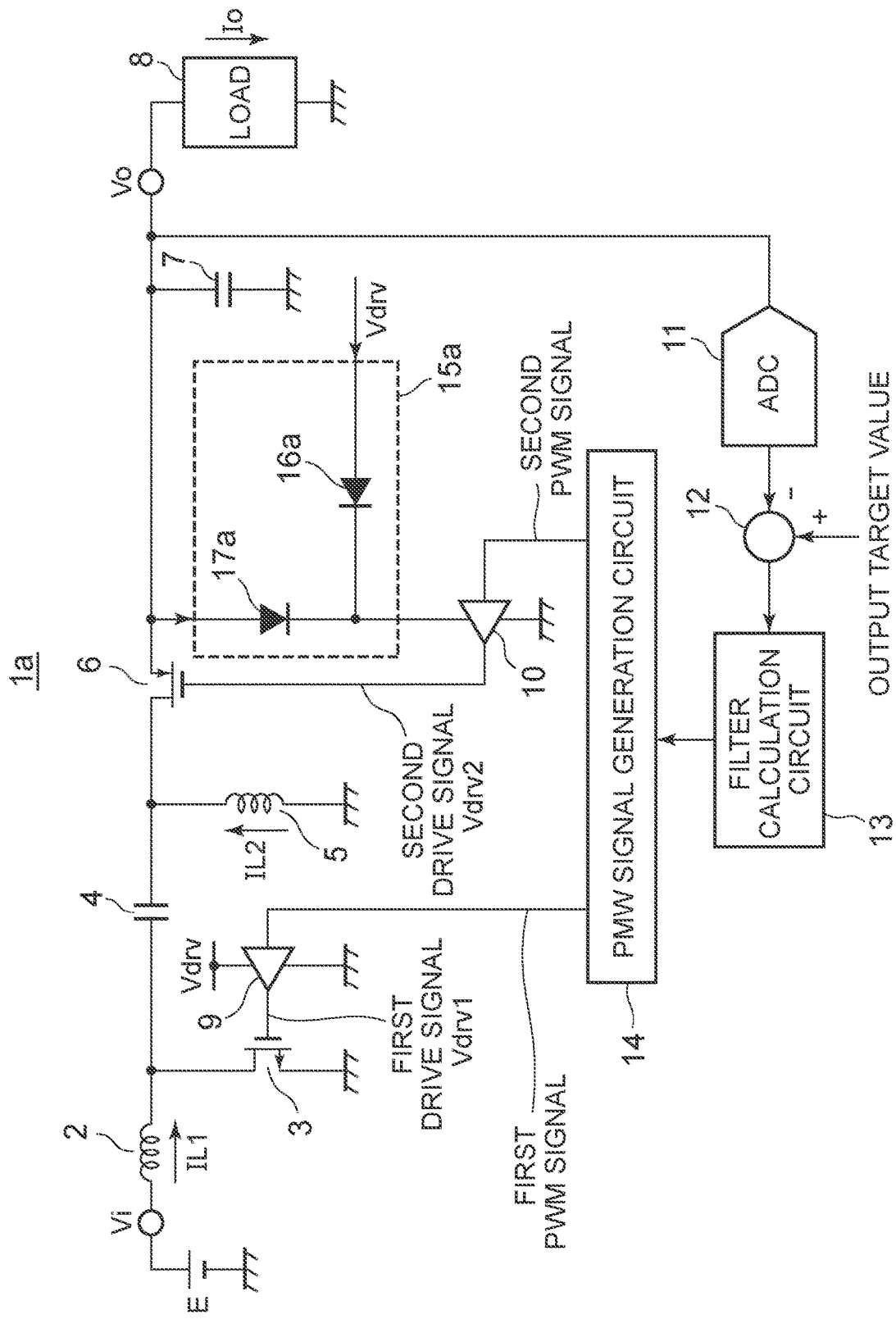
FIG. 3 is a diagram illustrating a DC/DC converter comprising a SEPIC circuit according to one or more embodiments.

FIG. 3 is a diagram illustrating a SEPIC converter according to Embodiment 2. In this SEPIC converter, the drive voltage switching circuit 15 is changed to a drive voltage switching circuit 15a for the SEPIC converter illustrated in FIG. 1. The drive voltage switching circuit 15a comprises a diode 16a and a diode 17a with a cathode common connection. The drive voltage switching circuit 15a is configured with an OR circuit of the diode 16a and the diode 17a and compares the output voltage Vo with the drive voltage Vdrv. When the output voltage Vo is lower than the drive voltage Vdrv, the drive voltage Vdrv is supplied from the diode 16a to the power supply terminal of the second drive circuit 10. As a result, the P-channel MOSFET 6 is driven by the drive voltage Vdrv. When the output voltage Vo exceeds the drive voltage Vdrv, the output voltage Vo is supplied from the diode 17a to the power supply terminal of the second drive circuit 10. As a result, the P-channel MOSFET 6 is driven by the output voltage Vo. Embodiment 2 is a configuration in which the P-channel MOSFET 6 is driven via the diode 16a or the diode 17a. Since a voltage drop due to a forward voltage VF of the diode occurs, a Schottky diode or a diode having a low forward voltage may be used.

Embodiment 3

Figure 4:
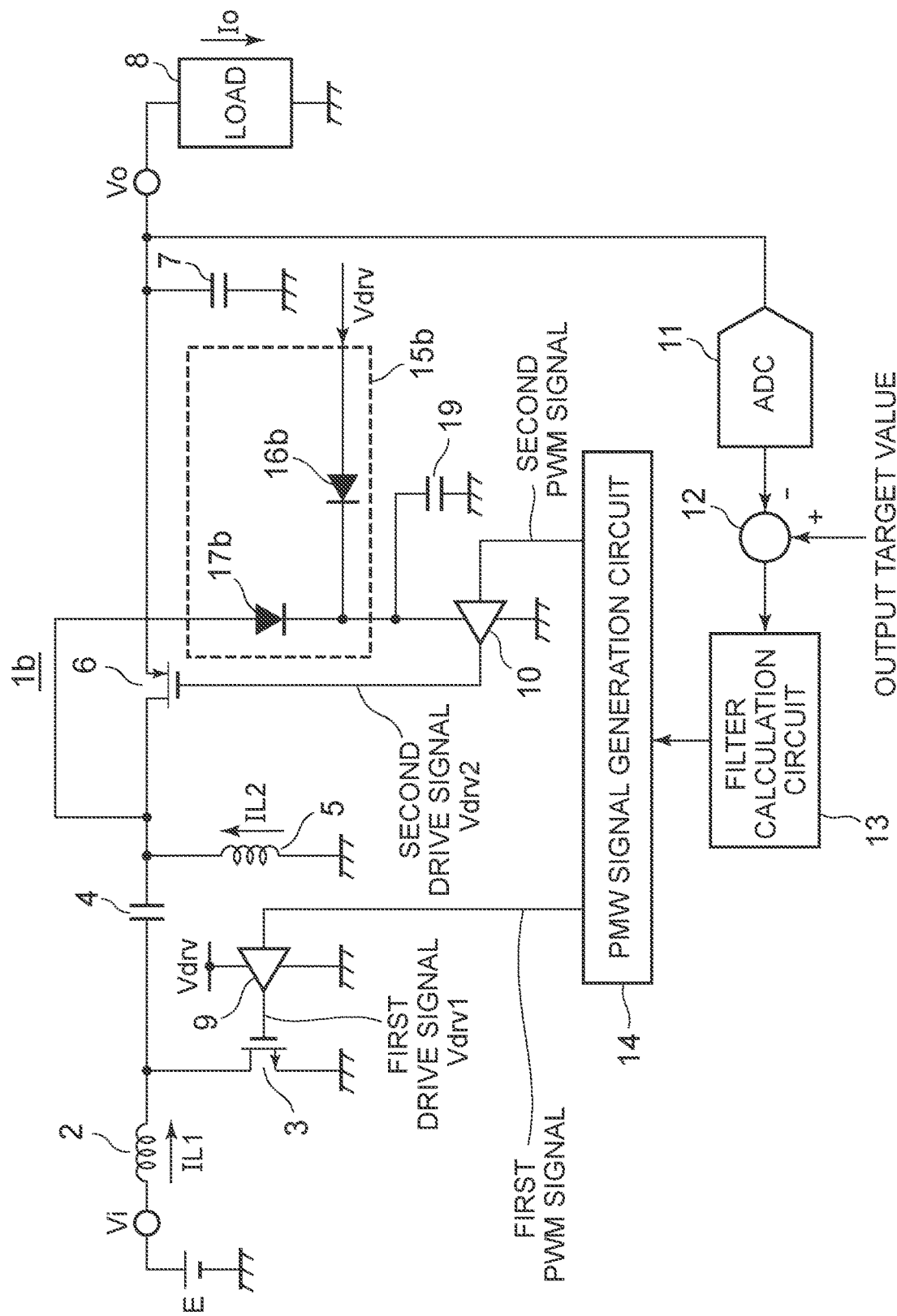
FIG. 4 is a diagram illustrating a DC/DC converter comprising a SEPIC circuit according to one or more embodiments.

FIG. 4 is a diagram illustrating a SEPIC converter according to Embodiment 3. In this SEPIC converter, the drive voltage switching circuit 15a is changed to a drive voltage switching circuit 15b for the SEPIC converter illustrated in FIG. 3. Embodiment 3 may generate a higher drive voltage than Embodiment 2 by connecting the anode of a diode 17b to the connecting point of the drain of the P-channel MOSFET 6, the second inductor 5 and the capacitor 4, and by OR connecting the cathode of the diode 17b to the drive voltage Vdrv. A voltage drop between the drain and the source when the P-channel MOSFET 6 is On is added to the output voltage Vo; therefore, when the output voltage Vo exceeds the drive voltage Vdrv, the voltage supplied from the diode 17b to the power supply terminal of the second drive circuit 10 may be higher than that of Embodiment 2 by the amount of the on-voltage between the drain and the source of the P-channel MOSFET 6. Therefore, the gate terminal voltage of the P-channel MOSFET 6 when the P-channel MOSFET 6 is Off is higher than that of Embodiment 2, and the gate terminal capacitance may be charged more quickly, so that the P-channel MOSFET 6 may be turned off at high speed.

Embodiment 4

Figure 5:
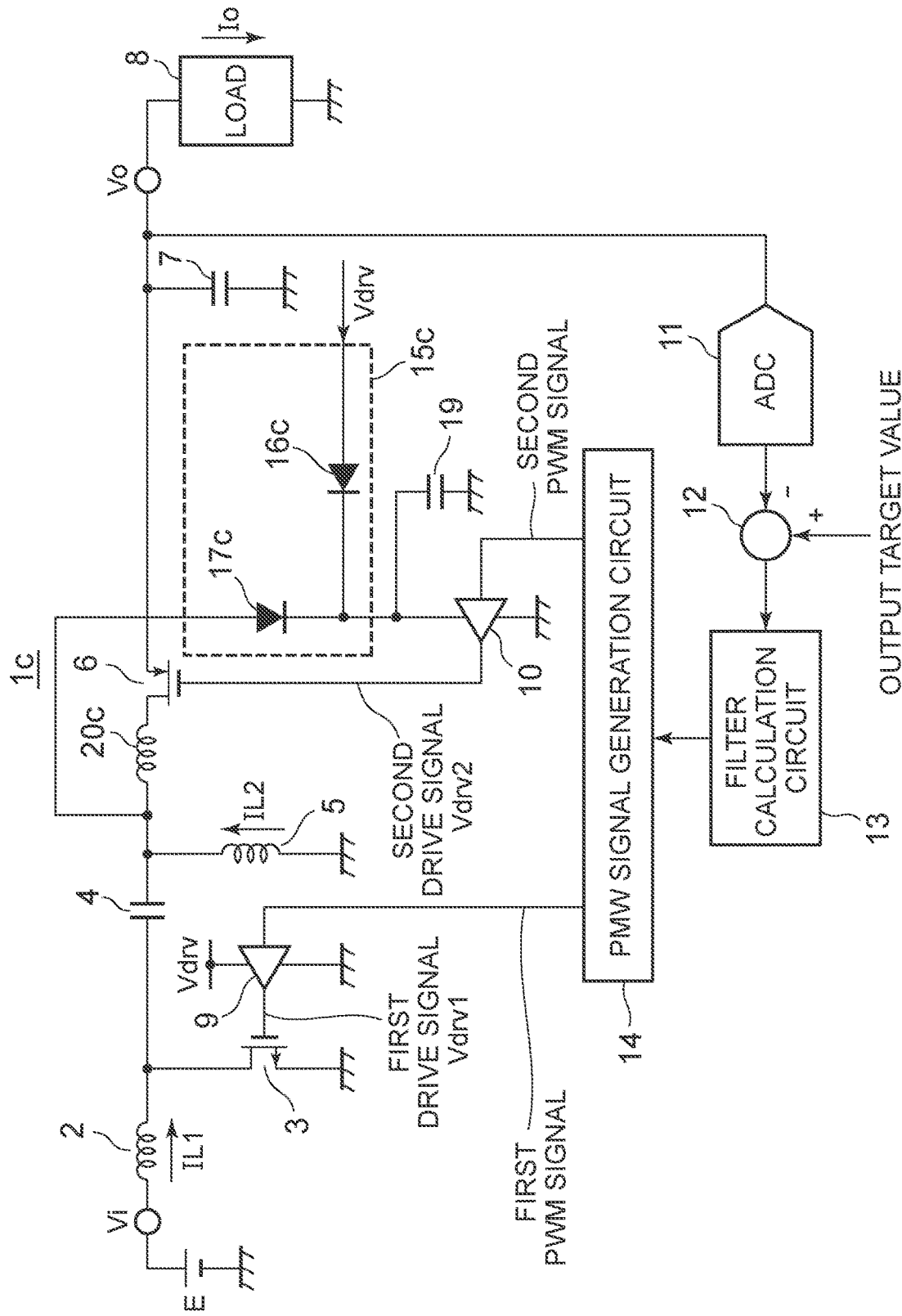
FIG. 5 is a diagram illustrating a DC/DC converter comprising a SEPIC circuit according to one or more embodiments.
Figure 6:
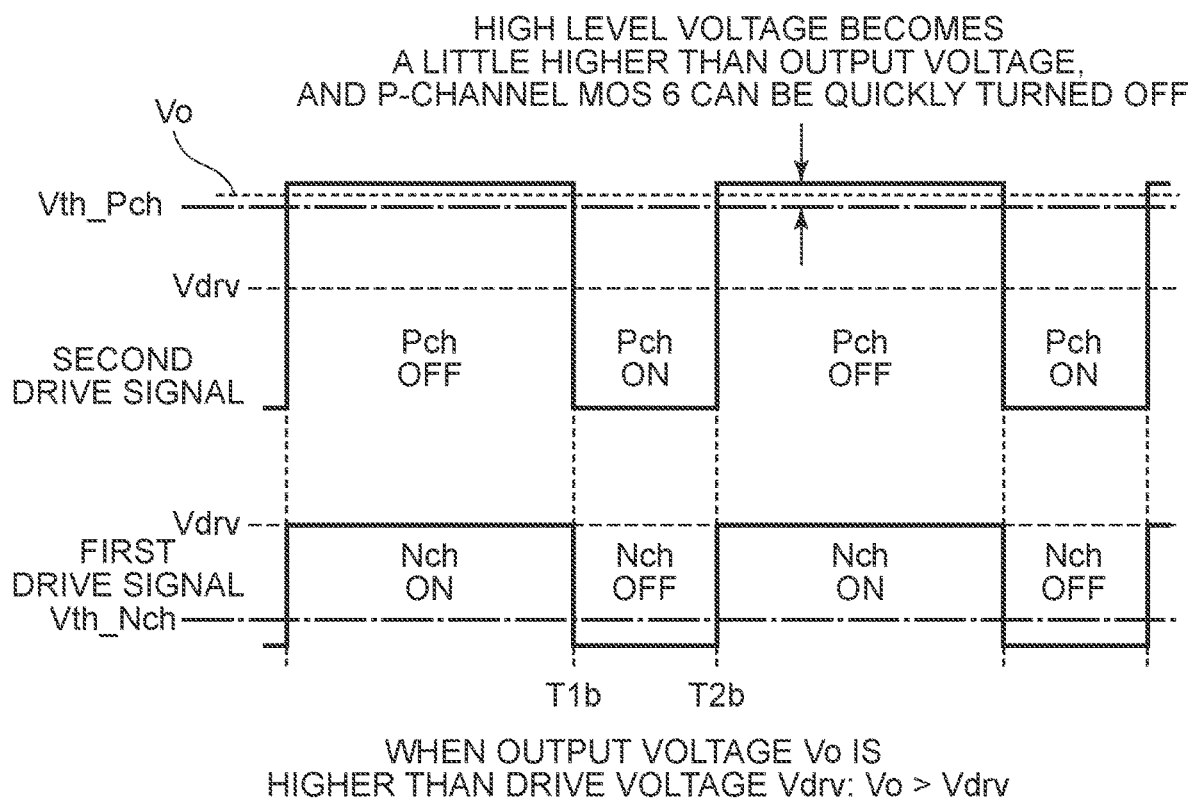
FIG. 6 is a diagram illustrating the first drive signal and the second drive signal when an output voltage Vo is higher than a drive voltage Vdrv in one or more embodiments illustrated in FIG. 5.
Figure 7:
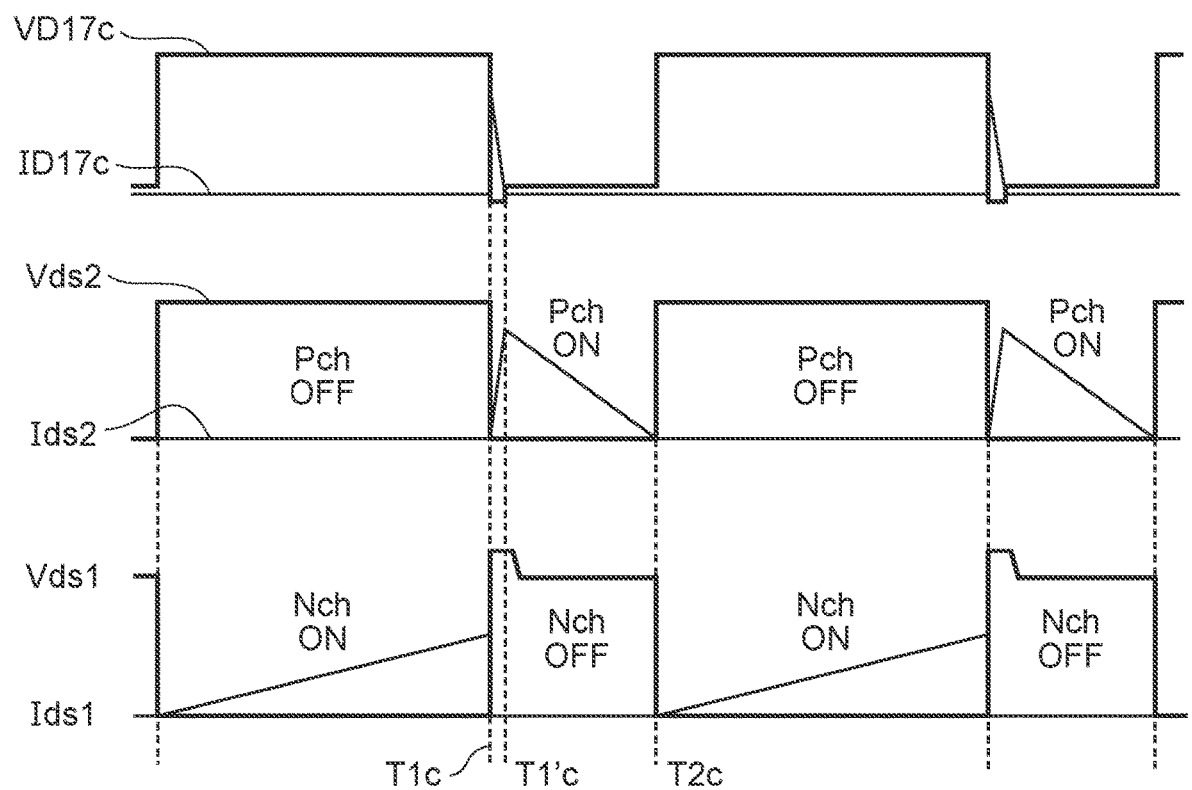
FIG. 7 is a diagram illustrating operating waveforms of each part when the output voltage Vo is higher than the drive voltage Vdrv in one or more embodiments illustrated in FIG. 5.

FIG. 5 is a diagram illustrating a SEPIC converter according to Embodiment 4. In this SEPIC converter, the drive voltage switching circuit 15b is changed to a drive voltage switching circuit 15c for the SEPIC converter illustrated in FIG. 4, and a third inductor 20c is added between the connecting point of the second inductor 5, the capacitor 4, and the anode of a diode 17c and the drain terminal of the P-channel MOSFET 6. The third inductor 20c may be an inductor having a small inductance value, such as a ferrite bead, or may be substituted by an inductor of the substrate wiring etc. Embodiment 4 connects the third inductor 20c with the P-channel MOSFET 6 in series and may set the High side voltage of the drive output of the second drive circuit 10 higher than the output voltage Vo. Therefore, Embodiment 4 may achieve faster switching than switching in Embodiment 3 and may configure a more efficient power supply. FIG. 6 is a diagram illustrating the first drive signal and the second drive signal when the output voltage Vo is higher than the drive voltage Vdrv. FIG. 7 is a diagram illustrating operating waveforms of the N-channel MOSFET 3, the P-channel MOSFET 6, and the diode 17c under the same condition of FIG. 6. When the P-channel MOSFET 6 turns off and the P-channel MOSFET 6 turns on at the timing of T1c illustrated in FIG. 7, an electromotive force is generated in the third inductor 20c, and a charging current flows through the diode 17c to a capacitor 19 until the period of time T1'c. As illustrated in FIG. 6, Embodiment 4 has an effect of supplying the High side voltage of the second drive signal of the P-channel MOSFET 6 as high as the charging voltage by the third inductor 20c. Therefore, Embodiment 4 may charge the gate terminal capacitance of the P-channel MOSFET 6 quickly and may turn off the P-channel MOSFET 6 at high speed.

Embodiment 5

Figure 8:
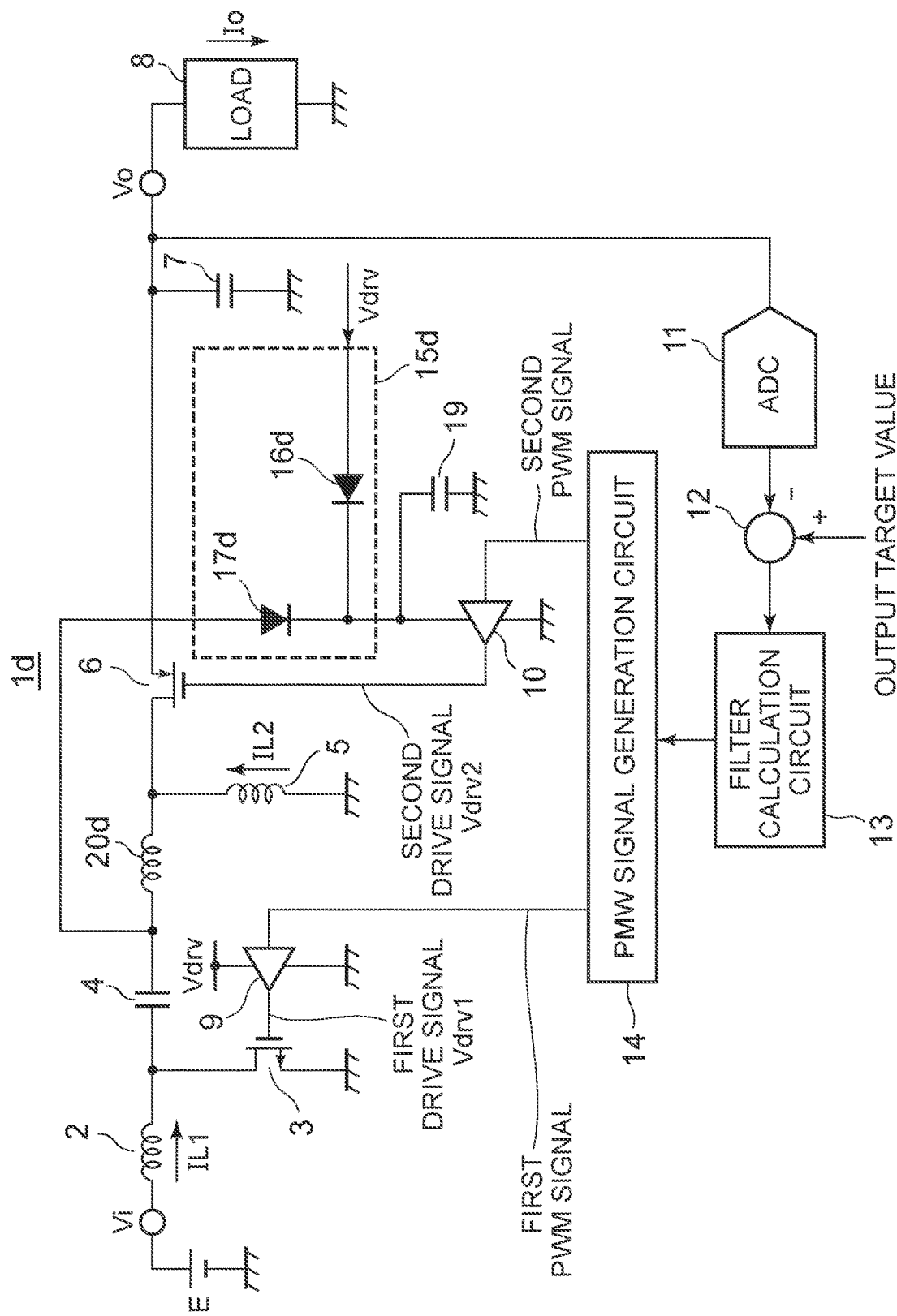
FIG. 8 is a diagram illustrating a DC/DC converter comprising a SEPIC circuit according to one or more embodiments.

FIG. 8 is a diagram illustrating a SEPIC converter according to Embodiment 5. In this SEPIC converter, the drive voltage switching circuit 15c is changed to a drive voltage switching circuit 15d, and a third inductor 20d is inserted between the capacitor 4 and the connecting point of the second inductor 5 and the drain terminal the P-channel MOSFET 6. In addition, the anode of a diode 17d of a drive voltage switching circuit 15d is connected to the connecting point of the capacitor 4 and the second inductor 5. As with Embodiment 4, the third inductor 20d may be an inductor having a small inductance value, such as a ferrite bead, or may be substituted by an inductor of substrate wiring etc. Embodiment 5 connects the third inductor 20d with the P-channel MOSFET 6 in series and may set the High side voltage of the drive output of the second drive circuit 10 higher than the output voltage Vo; therefore, Embodiment 5 may achieve the same effect as Embodiment 4.

Embodiment 6

Figure 9:
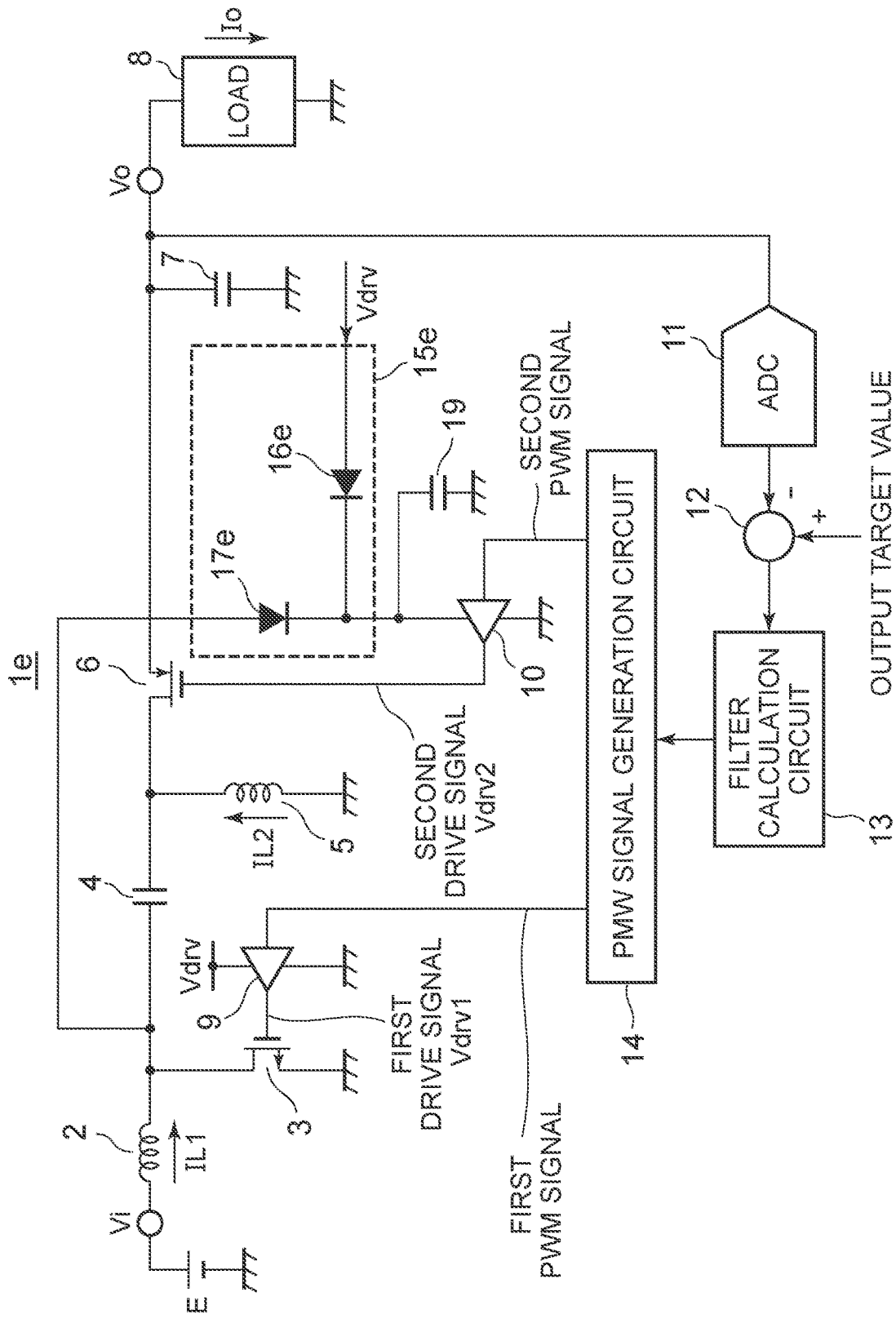
FIG. 9 is a diagram illustrating a DC/DC converter comprising a SEPIC circuit according to one or more embodiments.
Figure 10:
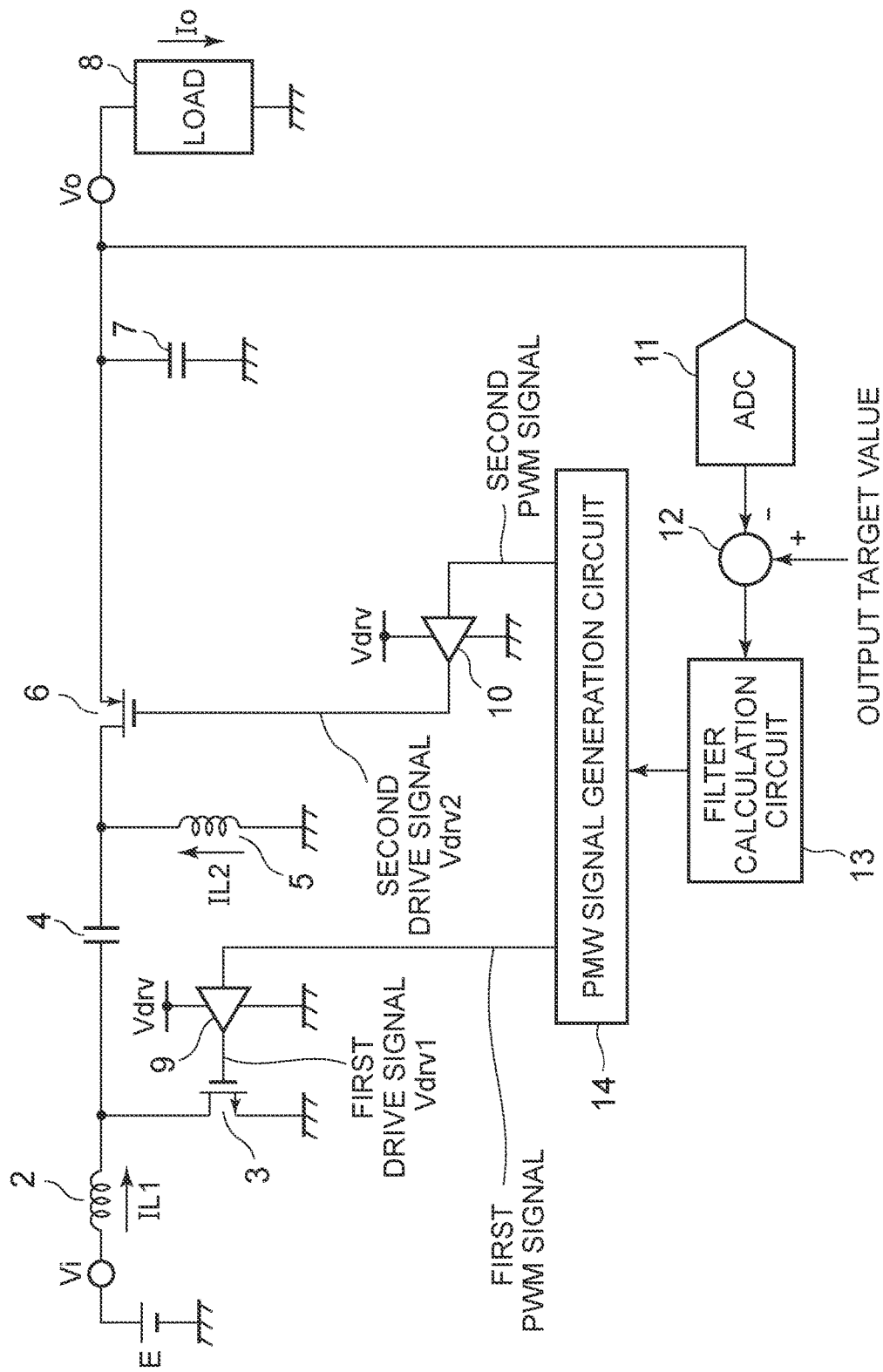
FIG. 10 is a diagram illustrating a SEPIC circuit for the related art.
Figure 11A:
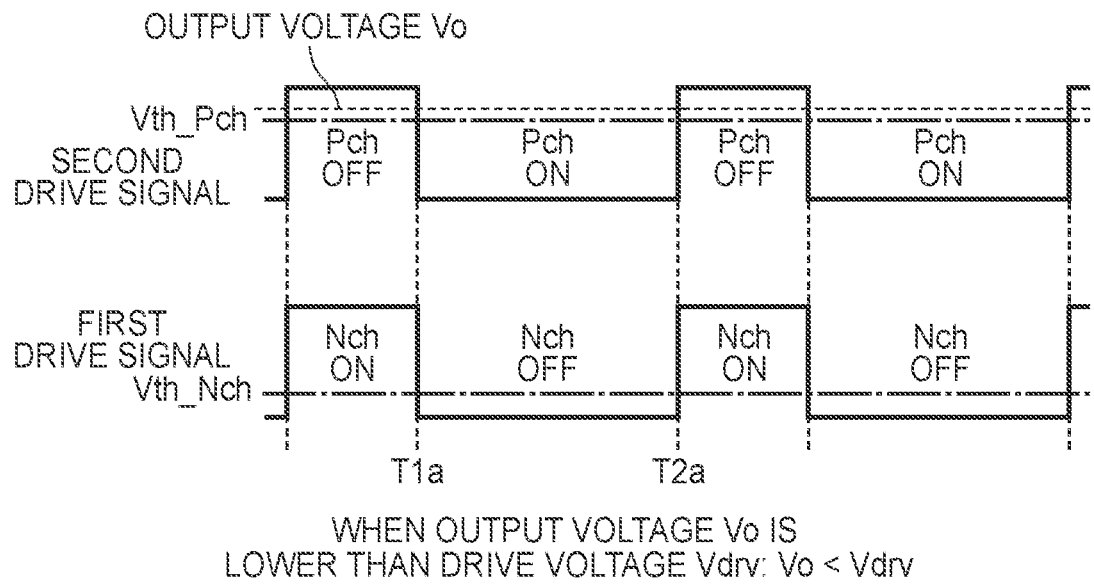
FIGS. 11A and 11B are diagrams illustrating the first drive signal and the second drive signal according to the voltage magnitude relationship between the drive voltage and the output voltage in the related art illustrated in FIG. 10.
Figure 11B:
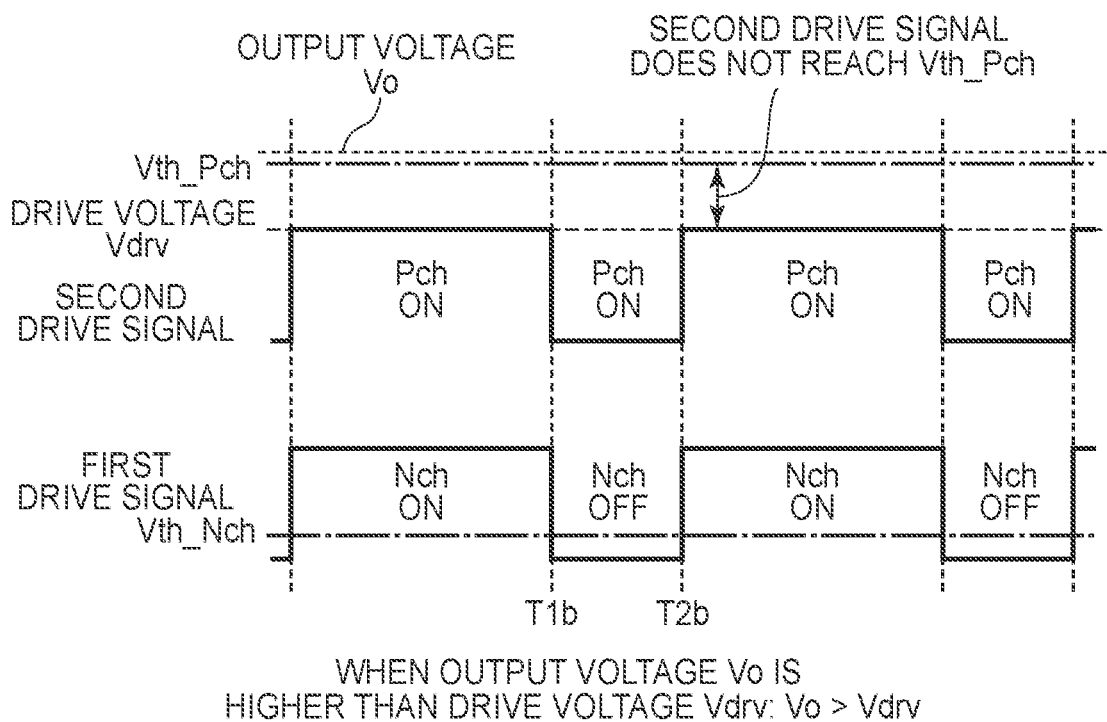

FIG. 9 is a diagram illustrating a SEPIC converter according to Embodiment 6. In this SEPIC converter, the drive voltage switching circuit 15 is changed to a drive voltage switching circuit 15e for the SEPIC converter illustrated in FIG. 3. Also, the connection of the anode terminal of a diode 17e of the drive voltage switching circuit 15e is changed from the output voltage Vo to the connecting point of the first inductor 2, the capacitor 4, and the drain terminal of the N-channel MOSFET 3. The pulse voltage value of the anode terminal voltage of the diode 17e becomes the sum of the input voltage Vi and the output voltage Vo, and the voltage of the second drive signal of the P-channel MOSFET 6 may be supplied as high as the input voltage Vi. Therefore, Embodiment 6 may make the gate terminal voltage of the P-channel MOSFET 6 when the P-channel MOSFET 6 is turned off higher than the output voltage Vo and may charge the gate terminal capacitance quickly. Thus, Embodiment 6 may turn off the P-channel MOSFET 6 at high speed.

As explained above, a DC-DC converter that is a synchronous rectification type SEPIC according to one or more embodiments includes a drive voltage switching circuit of a drive circuit for driving a synchronous rectification MOS transistor. The drive voltage switching circuit switches the connection so that the drive circuit supplies power from the output voltage to the drive circuit when the drive voltage for supplying power to the drive circuit is set to be lower than the output voltage. The drive voltage switching circuit switches the connection so as to supply power from the drive voltage when the drive voltage for supplying power to the drive circuit is set to be higher than the output voltage.

A DC-DC converter that is a synchronous rectification SEPIC according to one or more embodiments may secure a power supply for driving a synchronous rectification MOS transistor by switching and connecting to a higher voltage, either a drive voltage or an output voltage. As a result, the DC-DC converter allows the P-channel MOSFET to be driven off reliably.

A DC-DC converter that is a synchronous rectification SEPIC according to one or more embodiments may provide a drive power supply that may control a synchronous rectification P-channel MOSFET of a SEPIC circuit regardless of an output voltage setting range.

Although one or more embodiments have been described above, the above embodiments are examples for embodying the technical idea of the present invention and do not specify individual configurations, combinations, etc. to those described above. The present invention may be implemented with various changes without departing from the scope of the invention.

A drive power supply according to one or more embodiments may be suitable for use such as a power supply for driving a synchronous rectification element of a SEPIC converter. Accordingly, the drive power supply may be used for power supplies for on-board devices etc.

EXPLANATION OF THE SIGN 1, 1a, 1b, 1c, 1d, 1e: SEPIC converter
2: First inductor
3: N-channel MOSFET
4: Capacitor
5: Second inductor
6: P-channel MOSFET
7: Output capacitor
8: Load
9: First drive circuit
10: Second drive circuit
11: AD converter
12: Subtractor
13: Filter calculation circuit
14: PWM signal generation circuit
15, 15a, 15b, 15c, 15d, 15e: Drive voltage switching circuit
16a, 16b, 16c, 16d, 16e: Diode
17a, 17b, 17c, 17d, 17e: Diode
18: Voltage switching control circuit
19: Capacitor
20c, 20d: Third inductor

The invention claimed is:

1. A DC-DC converter comprising:
a first inductor connected between an input power supply and a first terminal of a coupling capacitor;
a first switching element connected between the first terminal of the coupling capacitor and a ground;
a second inductor connected between a second terminal of the coupling capacitor and the ground;
a second switching element connected between the second terminal of the coupling capacitor and an output terminal;
a drive circuit that drives the second switching element;
a drive voltage supply circuit that supplies power to the drive circuit;
a drive voltage switching circuit that switches a drive voltage of the drive circuit, wherein
the drive voltage switching circuit switches a connection so that the drive circuit supplies power with an output voltage or a voltage higher than the output voltage in response to the output voltage being higher than the drive voltage, and
the drive voltage switching circuit switches a connection so as to supply power to the drive circuit from the drive voltage in response to the output voltage being lower than the drive voltage;
an AD converter that detects the output voltage, and converts the output voltage into a digital value;
a subtractor that outputs a difference between the digital value and an output target value;
a filter calculation circuit that calculates an operation value based on the difference; and
a PWM signal generation circuit that generates a PWM signal corresponding to the operation value, wherein
the drive circuit outputs a voltage from the drive voltage switching circuit to the second switching element to drive the second switching element based on the PWM signal.

2. The DC-DC converter according to claim 1, wherein the drive voltage switching circuit comprises:
a first rectification circuit connected between the drive voltage and the drive circuit; and
a second rectification circuit connected between the output voltage and the drive circuit.

3. The DC-DC converter according to claim 1, wherein the drive voltage switching circuit comprises:
a first rectification circuit connected between the drive voltage and the drive circuit; and
a second rectification circuit connected between the output voltage and the drive circuit, wherein
the second rectification circuit is connected to a connecting point of the second terminal of the coupling capacitor and the second switching element.

4. A DC-DC converter comprising:
a first inductor connected between an input power supply and a first terminal of a coupling capacitor;
a first switching element connected between the first terminal of the coupling capacitor and a ground;
a second inductor connected between a second terminal of the coupling capacitor and the ground;
a second switching element connected between the second terminal of the coupling capacitor and an output terminal;
a drive circuit that drives the second switching element;
a drive voltage supply circuit that supplies power to the drive circuit; and
a drive voltage switching circuit that switches the drive voltage of the drive circuit, wherein
the drive voltage switching circuit switches a connection so that the drive circuit supplies power with an output voltage or a voltage higher than the output voltage in response to the output voltage being higher than the drive voltage, and
the drive voltage switching circuit switches a connection so as to supply power to a drive circuit from the drive voltage in response to the output voltage being lower than the drive voltage, wherein
the DC-DC converter further comprises:
a third inductor, wherein
the third inductor is connected between a connecting point of the second terminal of the coupling capacitor and the second inductor and the second switching element; and
a second rectification circuit, wherein
the second rectification circuit is connected to the connecting point of the second terminal of the coupling capacitor and the second inductor.

5. A DC-DC converter comprising:
a first inductor connected between an input power supply and a first terminal of a coupling capacitor;
a first switching element connected between the first terminal of the coupling capacitor and a ground;
a second inductor connected between a second terminal of the coupling capacitor and the ground;
a second switching element connected between the second terminal of the coupling capacitor and an output terminal;

a drive circuit that drives the second switching element;
a drive voltage supply circuit that supplies power to the drive circuit; and
a drive voltage switching circuit that switches the drive voltage of the drive circuit, wherein
   the drive voltage switching circuit switches a connection so that the drive circuit supplies power with an output voltage or a voltage higher than the output voltage in response to the output voltage being higher than the drive voltage, and
   the drive voltage switching circuit switches a connection so as to supply power to a drive circuit from the drive voltage in response to the output voltage being lower than the drive voltage, wherein
the DC-DC converter further comprises:
a third inductor, wherein
   one end of the third inductor is connected to the second terminal of the coupling capacitor, and the other end is connected to a connecting point of the second inductor and the second switching element, and
a second rectification circuit, wherein
   the second rectification circuit is connected to a connecting point of the second terminal of the coupling capacitor and the third inductor.

6. The DC-DC converter according to claim 1, wherein the drive voltage switching circuit comprises:
   a first rectification circuit connected between the drive voltage and the drive circuit; and
   a second rectification circuit connected between a connecting point of the first terminal of the coupling capacitor and the first switching element and the drive circuit.

7. The DC-DC converter according to claim 1, wherein the DC-DC converter comprises a synchronous rectification having a single ended primary inductor converter (SEPIC) type DC-DC converter.

\* \* \* \* \*